United States Patent
McCusker et al.

(10) Patent No.: US 9,534,922 B1
(45) Date of Patent: Jan. 3, 2017

(54) AIRCRAFT RECORDING SYSTEM, DEVICE, AND METHOD RESPONSIVE TO A NEW COMMAND NOT STATED IN A FLIGHT PLAN

(71) Applicant: Rockwell Collins, Inc., Cedar Rapids, IA (US)

(72) Inventors: Patrick D. McCusker, Walker, IA (US); Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 167 days.

(21) Appl. No.: 13/625,979

(22) Filed: Sep. 25, 2012

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)

(52) U.S. Cl.
CPC .............. *G01C 23/00* (2013.01); *G01C 23/005* (2013.01)

(58) Field of Classification Search
None
See application file for complete search history.

(56) References Cited

U.S. PATENT DOCUMENTS

| | | | |
|---|---|---|---|
| 9,115,995 B1* | 8/2015 | Owen | G01C 23/00 |
| 2004/0059474 A1* | 3/2004 | Boorman et al. | 701/14 |
| 2007/0288129 A1* | 12/2007 | Komer et al. | 701/3 |
| 2008/0163093 A1* | 7/2008 | Lorido | G01C 23/00 715/771 |
| 2010/0030401 A1* | 2/2010 | Rogers | G01C 23/00 701/3 |

* cited by examiner

*Primary Examiner* — Calvin Cheung
*Assistant Examiner* — Lail Kleinman
(74) *Attorney, Agent, or Firm* — Daniel M. Barbieri; Donna P. Suchy; Angel N. Gerdzhikov

(57) ABSTRACT

Present novel and non-trivial system, device, and method for recording a modification of an existing route plan are disclosed. The disclosed system may be comprised of a flight management system ("FMS"), at least one human-machine interface ("HMI") device, at least one display unit, and a route modification generator ("RMG"). The disclosed device may be comprised of the RMG configured to perform the disclosed method, where such method may be comprised of receiving a request to modify an existing route plan; retrieving the route plan from the FMS; generating a message data set representative of one or more pre-formatted messages having one or more visually-conspicuous, user-interactive variable fields; updating the message data set in response to a user's selection of each field; sending the updated data set to the display unit; receiving a pilot's authorization to modify the route plan, and sending the accepted, modified flight plan to the FMS.

20 Claims, 10 Drawing Sheets

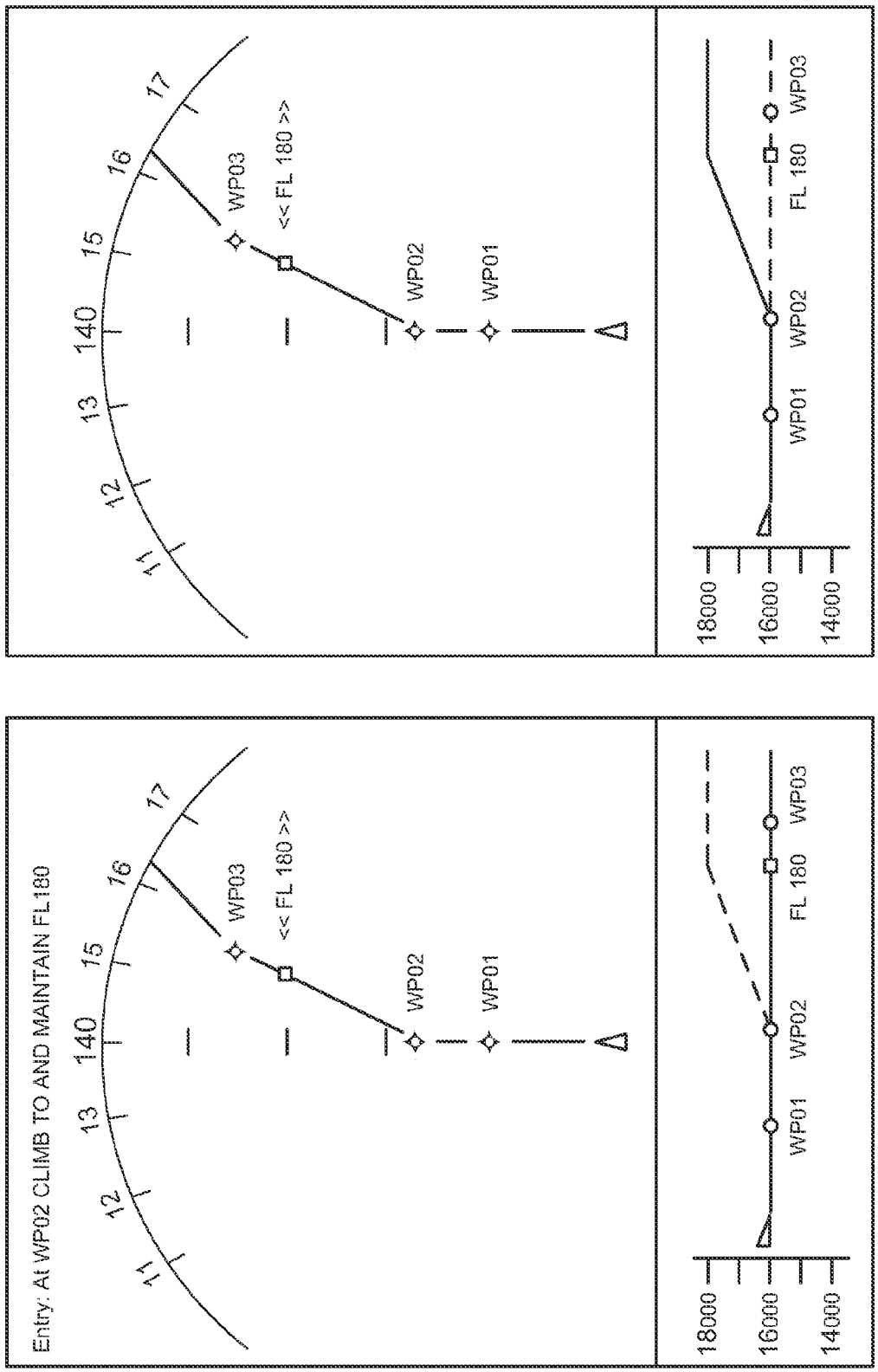

US 9,534,922 B1

AIRCRAFT RECORDING SYSTEM, DEVICE, AND METHOD RESPONSIVE TO A NEW COMMAND NOT STATED IN A FLIGHT PLAN

BACKGROUND OF THE INVENTION

Field of the Invention

This invention pertains generally to the field of aircraft display units that present flight plan information to the pilot or flight crew of an aircraft.

Description of the Related Art

An aircraft may be equipped with a flight management system ("FMS") for storing and providing the pilot with flight information such as, but not limited to, an approved flight plan. There is more than one method from which the flight plan information may be entered into the FMS. In one method, a pilot may manually enter waypoint information, where a sequence of waypoints may define the flight plan. In another method, the flight plan may be automatically uplinked into the FMS by air traffic control ("ATC") or a flight dispatch center of the owner or operator of the aircraft through the use of a communication datalink.

A flight plan may be modified at any time during the flight. One such method of modifying the flight plan includes the use of controller-pilot data link communications ("CPDLC") in which ATC may communicate with the flight crew through the datalink system. Those skilled in the art understand that clearances transmitted via datalink communications may be limited to a small set of messages (potentially several hundred messages) in a structured format. The message formats may be controlled by an aviation industry standard(s) which may evolve slowly under a strict version control process. Because message formats may be highly structured, the FMS could be configured with a software program(s) which parses and interprets the messages. Furthermore, the FMS could be configured with a means to provide the pilot (E.G., a multi-function control display unit ("MCDU")) for accepting and/or rejecting a proposed modification.

Although an ATC-proposed modification may be uplinked to the flight crew, there may be areas or regions of the world where datalink communications are not available. Alternatively, the physical layout of the cockpit and location of the MCDU may cause the pilot to become distracted and lose focus on flying the aircraft and/or lose his or her ability to maintain situational awareness by keeping his or her attention directed straight ahead. While tactical and strategic flight displays (e.g., colloquially referred to as primary flight displays and navigation displays, respectively) are located directly in the pilot's forward field of view, the FMS MCDU on many aircraft may be found in a location adjacent to the pilot's lap. If the ATC proposal is uplinked from which the pilot has no option but to respond, the distraction caused by the pilot shifting his or her attention downward and to the left or right to view and respond may be detrimental to situational awareness. If the pilot wishes to orally communicate his acknowledgement of the modified flight plan, his or her oral acknowledgement will not modify the flight plan stored in the FMS, creating another potential loss of situational awareness; moreover, if the pilot has selected a "VNAV" and/or "LNAV" mode on a mode control panel associated with an auto flight system, an autopilot may not effectuate any changes of the modified flight plan without the modified flight plan being stored in the FMS.

BRIEF SUMMARY OF THE INVENTION

The embodiments disclosed herein present a novel and non-trivial system, device, and method for recording at least one command not stated in an existing route plan, where such command may modify the existing route plan.

In one embodiment, a system is disclosed for recording at least one command not stated in an existing route plan. The system could be comprised of a flight management system ("FMS"), at least one human-machine interface ("HMI") device, at least one display unit, and a route modification generator ("RMG"), where the HMI device may be configured to receive and provide pilot input data to the RMG; the display may be configured to graphically display the existing route plan.

In another embodiment, a device is disclosed for recording a modification of an existing route plan. The device could be comprised of the RMG configured to perform the method.

In another embodiment, a method is disclosed for recording a modification of an existing route plan. This method could be performed by the RMG configured for receiving a request to modify an existing route plan initiated by a user through an HMI device; retrieving the existing route plan of either a flight plan comprised of a plurality of waypoints or a taxi plan comprised of one or more defined surfaces; generating a message data set representative of one or more pre-formatted messages having one or more visually-conspicuous, user-interactive variable fields; receiving command data representative of at least one command not stated in the existing route plan; sending the command data to the flight management system; receiving the user's acceptance of the existing route plan; and sending the data representative of accepted, modified route plan to the FMS.

BRIEF DESCRIPTION OF THE DRAWINGS

FIG. 5I illustrates the notification on an HSD of a pilot-entered modification to the existing flight plan.

FIG. 5K illustrates the modified flight plan of the preceding figures.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
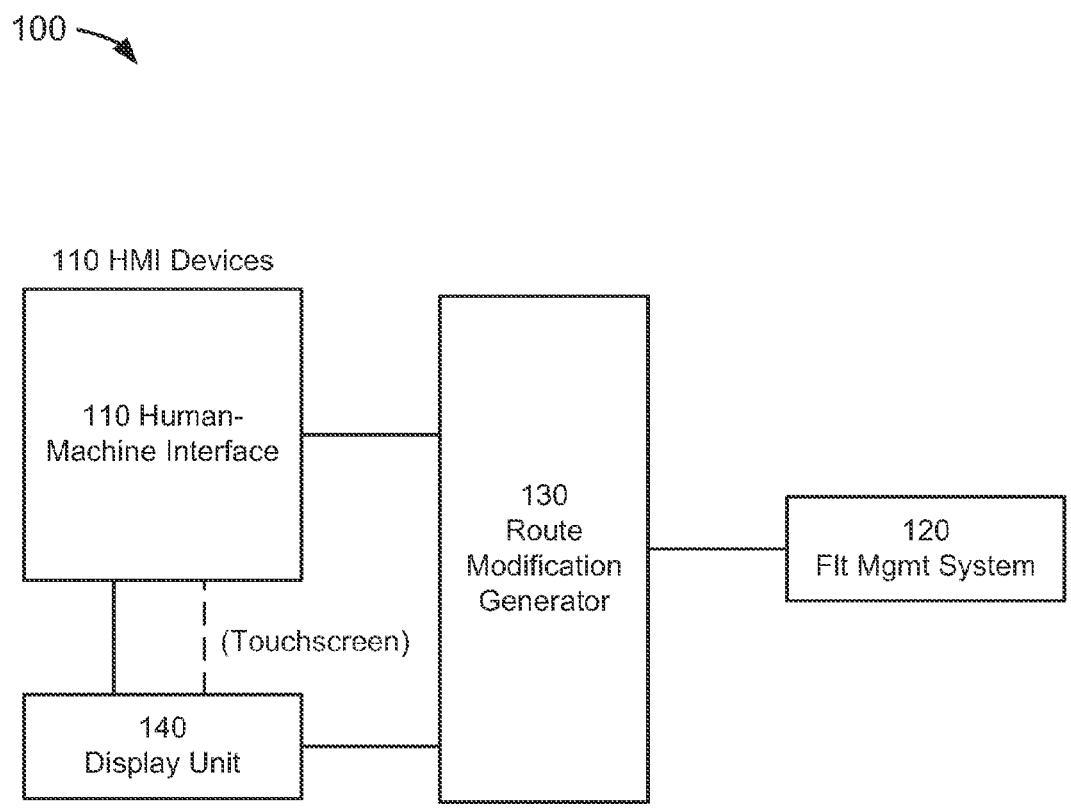
FIG. 1 depicts a block diagram of an aircraft route plan modification system.

FIG. 1 depicts a block diagram of an unstated command recording system (collectively, "recording system") 100 suitable for implementation of the techniques described herein. The recording system 100 of an embodiment of FIG. 1 includes a human-machine interface ("HMI") device 110, a flight management system ("FMS") 120, a route modification generator ("RMG") 130, and a display unit 140.

In an embodiment of FIG. 1, the HMI device 110 could be comprised of any device for facilitating a user's interaction with an aircraft system including his or her interaction with the FMS 120. The HMI device 110 could be comprised of a tactile input device that allows for an entry of data and/or a manual selection of graphical user interfaces (singularly, "GUI") displayed on the screen of a display unit. Such tactile input devices could include, but are not limited to, a keyboard, buttons, switches, control display unit ("CDU"), cursor control device ("CCD"), a touch screen device. If configured with a touchscreen, the display unit 140 could be included as an HMI device 110 if it is able to receive manual input. The display unit 140 configured with touchscreen device could also include a personal electronic device ("PED") such as, but not limited to, a handheld device, a tablet, a smartphone, and a notebook computer configured to establish a wireless connection with the FMS 120. The HMI device 110 may include any voice input device that allows for a voice entry of data and/or selection of widget through, for instance, a voice recognition system. The use of voice recognition systems are known to those skilled in the art. As embodied herein, the HMI device 110 may provide input representative of a viewer's selection to the RMG 130.

In an embodiment of FIG. 1, the FMS 120 could be comprised of any source(s) from which flight information may be stored and provided to or retrieved by the RMG 130. The FMS 120 may perform a variety of functions performed to help the crew in the management of the flight, and such functions are known to those skilled in the art. In the performance of its many functions, the FMS 120 may receive navigation data from one or more navigation systems containing information regarding the current state of the aircraft. The navigation system could be comprised of, but is not limited to, an air/data system, an attitude heading reference system, an inertial guidance system (or inertial reference system), a global navigation satellite system ("GNSS") or satellite navigation system such as the global positioning system ("GPS"), and a radio altimeter system, all of which are known to those skilled in the art. Each navigation system could provide navigation information including, but not limited to, geographic position, altitude, attitude, speed, vertical speed, heading, radio altitude, and data quality. As embodied herein, aircraft position could be comprised of geographic position (e.g., latitude and longitude coordinates) and altitude, and direction may be derived from either geographic position, aircraft position, or both.

It should be noted that, as embodied herein for any source or system in an aircraft including the FMS 120, data could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

Functions performed by the FMS 120 are known to those skilled in the art and could include receiving flight plan information and constructing lateral and vertical flight plan components. For aircraft equipped with an auto flight system to which FMS data is provided, the aircraft may automatically follow the active flight plan that is maintained in the FMS 120. Moreover, if a pilot selects "VNAV" and "LNAV" modes on a mode control panel associated with the auto flight system, an autopilot may effectuate any changes to the vertical and lateral flight plan components; the "VNAV" and "LNAV" modes are known to those skilled in the art.

Figure 2:
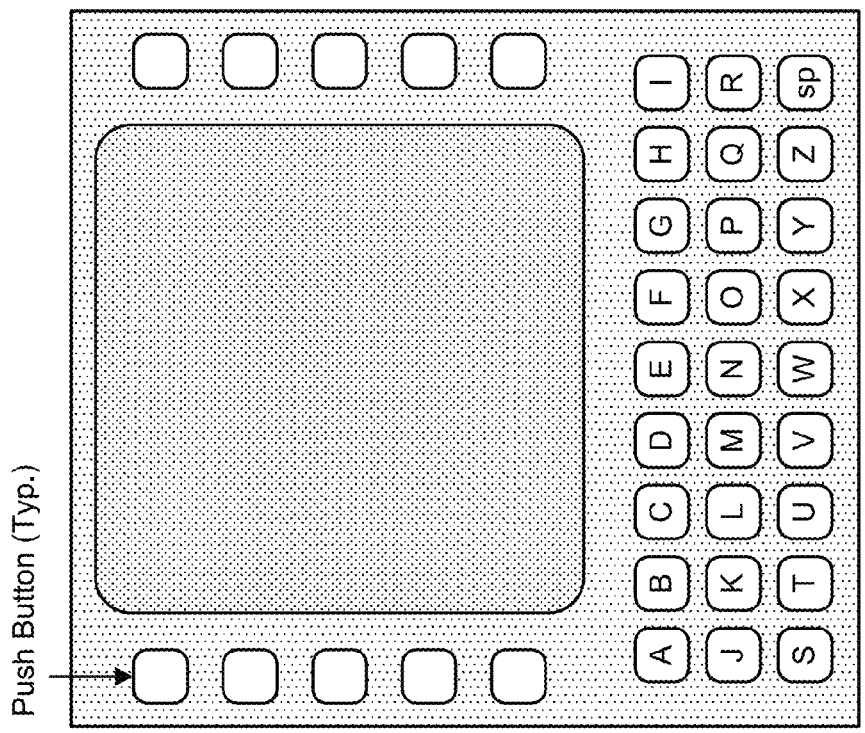
FIG. 2 provides a generic representation of a multi-function control display unit ("MCDU").

A pilot could create a flight plan from waypoints stored in a database or select a flight plan stored in a navigation database of the FMS 120. One technique through which a flight plan is created includes the use of a CDU that is part of the FMS 120. A generic representation of a CDU is the multi-function control display unit ("MCDU") shown in FIG. 2 that is configured with a plurality of push buttons associated with a line of text. Alternatively, the flight plan could be sent to the FMS 120 automatically through a datalink system, a system known to those skilled in the art which provides a communications link to one or more sources of data that are external to the aircraft.

Figure 3:
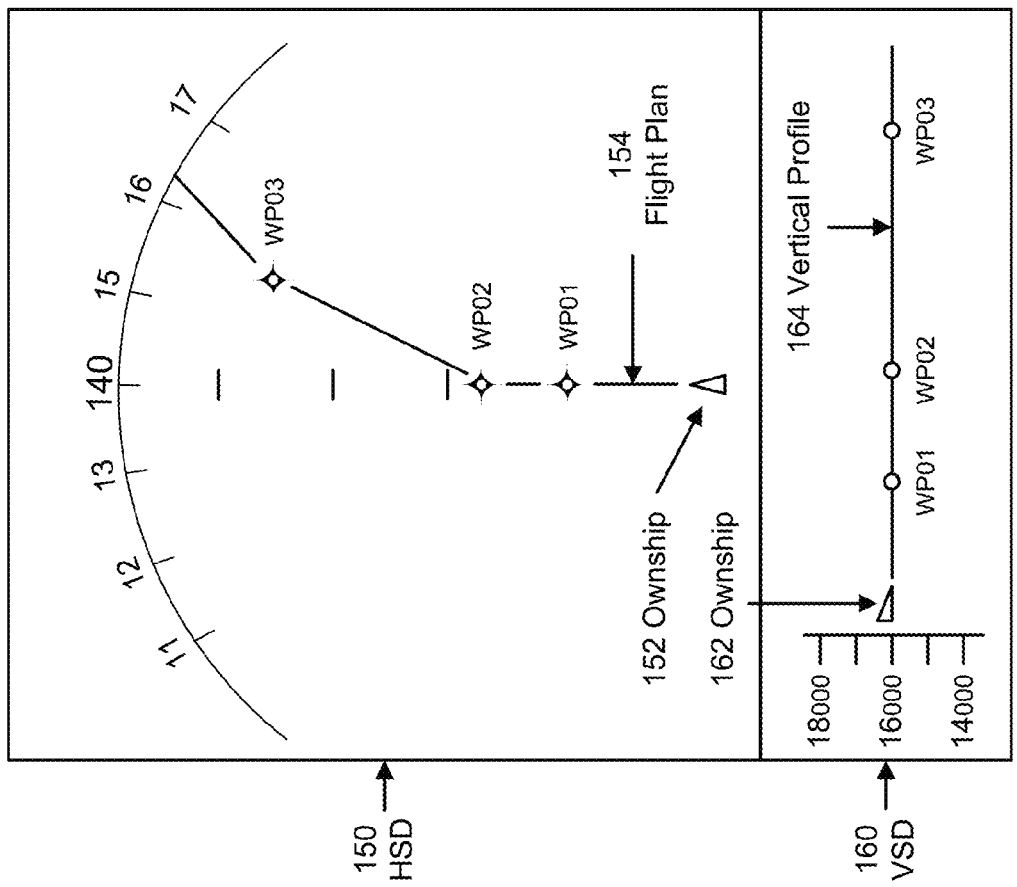
FIG. 3 provides a generic representation of a situation awareness display.

Once a flight plan has been created in the FMS 120, it may be presented graphically on the display unit 140. Referring to FIG. 3, the display unit is configured with a generic situation awareness display comprised of a horizontal situation display ("HSD") 150 and a vertical situation display ("VSD") 160 is shown. The symbols depicted in the HSD 150 include ownship 152 and a flight plan 154 comprised of at least waypoints WP01, WP02, and WP03. The symbols depicted by the VSD 160 include ownship 162, a vertical profile of the flight plan 164, and the three waypoints. A vertical axis representative of altitude scale is shown on the left side of the VSD 160, a horizontal axis that could be representative of either a distance scale and/or a time scale is shown in the center, and the waypoints WP01, WP02, WP03 are shown at their respective distances and/or times from ownship 162. From the information provided by the vertical profile, there is no change in altitude in the flight plan between the current position of ownship 162 and WP03.

It should be noted that, although the following discussion will be drawn to a flight plan comprised of a plurality of waypoints, the embodiments herein are not limited to a route plan that is a flight plan. Rather, the embodiments may be applied to any route plan such as a taxi plan comprised of one or more defined surfaces and their intersections (e.g., taxiways, aprons, runways, etc. . . . ).

In an embodiment of FIG. 1, the RMG 130 may be any electronic data processing unit which executes software or computer instruction code that could be stored, permanently or temporarily, in a digital memory storage device or computer-readable medium (not depicted herein) including, but not limited to, RAM, ROM, CD, DVD, hard disk drive, secure digital cards, and/or compact flash cards. The RMG 130 may be driven by the execution of software or computer instruction code containing algorithms developed for the specific functions embodied herein. The RMG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the RMG 130 could be a processor(s) used by or in conjunction with any other system of the aircraft including, but not limited to, the HMI device 110, the FMS 120, the display unit 140, or any combination thereof.

The RMG 130 may be programmed or configured to receive as input data representative of information obtained from various systems and/or sources including, but not limited to, the HMI device 110 and the FMS 120. As embodied herein, the terms "programmed" and "configured" are synonymous. The RMG 130 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The RMG 130 may be programmed or configured to execute one or both of the methods discussed in detail below. The RMG 130 may be programmed or configured to provide output data to various systems and/or units including, but not limited to, the display unit 140.

In an embodiment of FIG. 1, the display unit 140 may be comprised of one or more display units configured with a screen and configured to display on the screen the images which will be presented below. The display unit 140 could include a display screen integrated with a control panel on which a flight plan may be modified and/or a display unit configured to display the HSD 150 and the VSD 160. As stated above, the display unit 140 configured with a touchscreen may be considered as one HMI device 110.

A flight plan may be modified at any time during the flight. One such method of modifying the flight plan through new commands not stated in the flight plan includes the use of controller-pilot data link communications ("CPDLC") in which air traffic control ("ATC") may communicate with the flight crew through the datalink system. Those skilled in the art understand that clearances (i.e., unstated commands) transmitted via datalink communications may be limited to a small set of messages (potentially several hundred messages) in a structured format. As embodied herein, the terms "command" and "clearance" are synonymous and/or interchangeable with each other. The message formats may be controlled by an aviation industry standard(s) which may evolve slowly under a strict version control process. Because message formats may be highly structured, the FMS could be configured with a software program(s) which parses and interprets the messages.

Figure 4B:
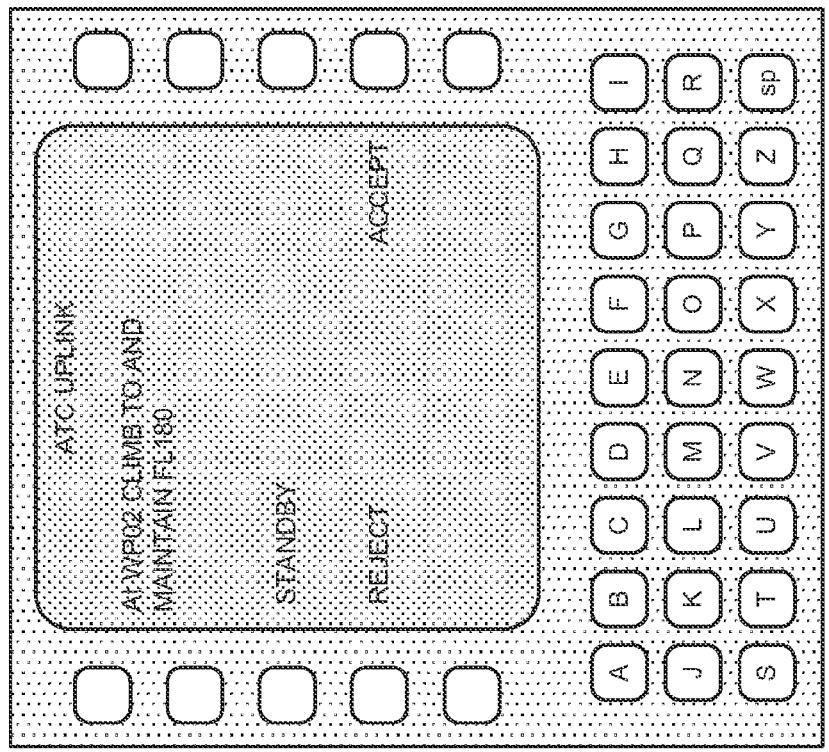
FIG. 4B depicts an MCDU on which a notification of an uplinked message is displayed.
Figure 4A:
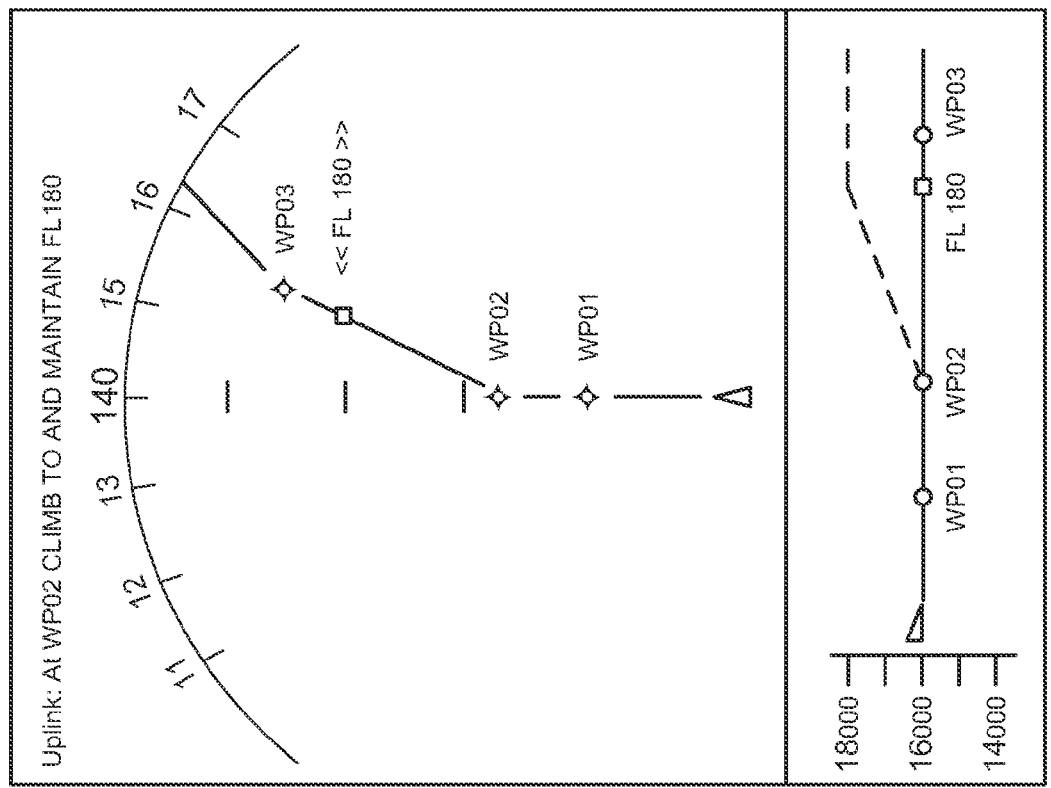
FIG. 4A depicts a horizontal situation display ("HSD") on which a notification of an uplinked message is displayed.

Referring to the examples provided in FIGS. 4A and 4B, it will be assumed that ATC has uplinked a message of a proposed modification to the flight plan shown in FIG. 3. Upon being received by the FMS 120 through the datalink, the proposal could be presented to the flight crew on the HSD. As shown in FIG. 4A, the uplinked proposal is shown as the text message "Uplink: At WP02 CLIMB TO AND MAINTAIN FL180" in the HSD directing the flight crew along to climb to flight level 180 upon reaching WP02 in the flight plan. As indicated in both the HSD and the VSD by the addition of a square to the flight plan and the text "<<FL 180>>" adjacent to the square, the FMS 120 has calculated and created a waypoint along the flight plan at the point in which the aircraft will reach FL 180 after beginning its climb at WP02. The dashed line added in the VSD indicates the change to the vertical flight path resulting from the proposed modification.

Referring to FIG. 4B, the message of the proposal could also be provided to the flight crew on the MCDU. In addition to presenting the message, the MCDU could provide the means through which the flight crew may respond to the proposal. As shown in FIG. 4B, the pilot is presented with three possible responses: STANDBY, REJECT, or ACCEPT. Upon selecting one of the three choices by pressing an adjacent line select push button, the FMS 120 may generate and send a message representative of the pilot's response to ATC through the datalink system.

Although an ATC-proposed modification may be uplinked to the flight crew to which they may choose a response from a limited amount of options, there may be areas or regions of the world where datalink communications are not available. Alternatively, the physical layout of the cockpit and location of the MCDU may cause the pilot to become distracted and lose focus on flying the aircraft and/or lose his or her ability to maintain situational awareness by keeping his or her attention directed straight ahead. While tactical and strategic flight displays (e.g., colloquially referred to as primary flight displays and navigation displays, respectively) are located directly in the pilot's forward field of view, the FMS MCDU on many aircraft may be found in a location adjacent to the pilot's lap. If the ATC proposal is uplinked and the pilot has no option but to respond, the distraction caused by the pilot shifting his or her attention downward and to the left or right to view and respond may be detrimental to situational awareness. If the pilot wishes to orally communicate an acknowledgement of the modified flight plan, his or her oral acknowledgement will not modify the flight plan stored in the FMS 120, creating another potential loss of situational awareness; moreover, if the pilot has selected a "VNAV" and/or "LNAV" mode on a mode control panel associated with the auto flight system, an autopilot may not effectuate any changes of the modified flight plan without the modified flight plan being stored in the FMS 120.

The advantages and benefits of the embodiments disclosed herein may be illustrated by presenting an HMI device 110 configured with a method that may be installed in a glareshield panel, a panel located to the front of the flight crew that could include, for instance, the mode control panel associated with an auto fight system and through which the pilot may control the aircraft without manually manipulating a control wheel. As discussed above, modifications made to the flight plan may result with an auto pilot effectuating changes to the vertical and lateral components of the modified flight plan. Although not limiting, the method disclosed herein could be adapted to a new or existing control panel installed in the glareshield.

Figure 5A:
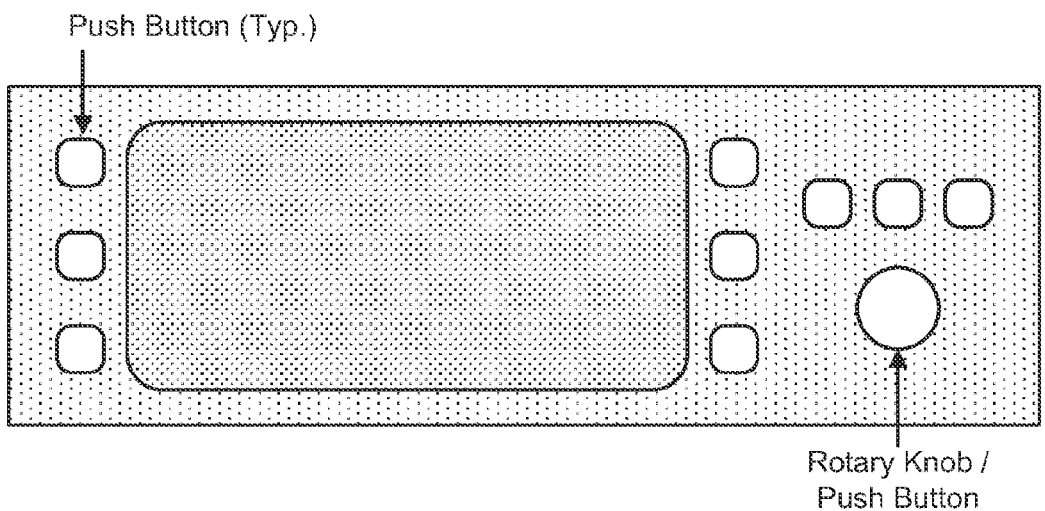
FIG. 5A provides a generic representation of a control panel for recording a command not stated in the existing route plan.

Referring to FIG. 5A, a generic representation of an HMI device 110 comprised of a control panel is illustrated, where the control panel may be used to manually capture a proposed flight plan modification received from ATC through a voice communications channel in situations where a datalink in unavailable or the use of which for the modification of a flight plan is undesirable. The generic control panel provides a small screen that allows a line-oriented, text-based user menu to be displayed in conjunction with push buttons associated with each line (similar to an MCDU). As known to those skilled in the art, control panels may be configured with push buttons, rotary knobs, and/or rotary knobs combined with push buttons.

To illustrate the embodiments disclosed herein, the following sequence of figures shows the entry of a proposal flight plan into the panel comprised of a display window, a standard push button, and a combination rotary knob/push button. It should be noted that the exact layout of the control panel is not necessarily relevant to the embodiments disclosed herein.

For the purpose of illustration, it will be assumed that the following clearance has been received by the pilot: "at waypoint number 2, climb to flight level and maintain flight level 180" which corresponds very closely to the published datalink format of "At WP02 CLIMB TO AND MAINTAIN FL180" discussed above. It should be noted that, although voice communications may match or closely match the words of a standard datalink message format employed in CPDLC, human nature may lead to occasions where the air traffic controller may use a more colloquial message such as "climb and maintain 180 when you get to waypoint number 2". In this case, however, the colloquial message is still close enough to the standard phraseology that the crew may mentally map a message format to what is heard without placing an undue burden on him or her.

Figure 5B:
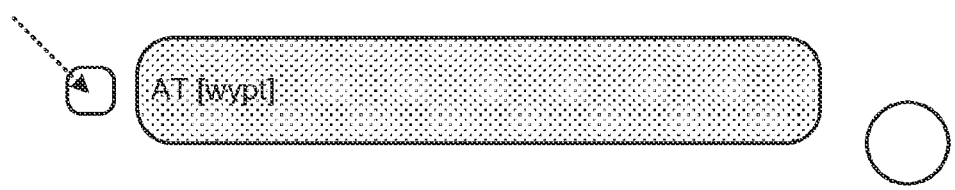
FIGS. 5B through 5H provide a sequence of pilot actions for recording a command not stated in the existing route plan on a control panel.

As shown in FIG. 5B, the pilot may push a button on the control panel to bring up pre-formatted messages for all proposals; it should be noted that the control panel of FIG. 5A has been simplified to show only the components of the control panel that are needed to enter the clearance. For the purpose of illustration, it will be assumed that the first pre-formatted message that is displayed when the button is pushed is "AT [waypoint]" (waypoint is abbreviated as "wypt"). Pre-formatted messages may be text-based or can be a combination of text and variables. Here, the text of the message is shown with upper case characters and the variable field is shown with lower case characters enclosed by square brackets.

Figure 5C:
Figure 5D:
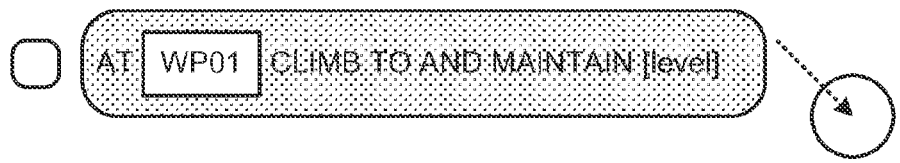

Then, as shown in FIG. 5C, the pilot may turn the rotary knob to scroll through a list of all clearances that begin with "AT [waypoint]" to get to the "AT [waypoint] CLIMB TO AND MAINTAIN [level]" pre-formatted message. Once the correct message has been indicated on the screen, the rotary knob may be pushed to select the message as shown in FIG. 5D. Upon the selection of the correct message, the RMG 130 could be programmed to automatically activate the first variable field, which is indicated in FIG. 5D with the replacement of the brackets with the rectangle; although the activated fields discussed herein will be drawn to rectangles, the use of rectangles herein is meant to describe a change of appearance in order to make the active variable field visually conspicuous. Moreover, because the first variable field is a waypoint field, the RMG 130 could be programmed to automatically populate the variable field with the next waypoint (i.e., WP01) of the flight plan.

Figure 5E:
Figure 5F:

Then, as shown in FIG. 5E, the pilot may turn the rotary knob to scroll through a list of future waypoints specified in the flight plan. If the clearance does not include a specified waypoint, then the RMG 130 could be configured to display waypoints that are close to or nearby the flight plan. Here, because the waypoint field has been automatically populated with the next waypoint WP01 of the flight plan, the next waypoint in sequence to be displayed when the pilot begins turning the knob is WP02. Because this is the desired waypoint (i.e., the waypoint at which the aircraft will begin its climb), the pilot may push the rotary knob to enter the waypoint in the field as shown in FIG. 5F. The disappearance of the rectangle indicates the entry of the waypoint into the field. Also, the next variable field is highlighted. Here, the "level" field is indicative of a flight level, and it has been populated with the current flight level of ownship corresponding to the altitude of 16,000 feet above mean sea level ("MSL").

Figure 5G:
Figure 5H:

Then, as shown in FIG. 5G, the pilot may turn the rotary knob to scroll through a sequence of increasing flight levels (or a sequence of decreasing flight levels if a descent is specified in the clearance) until flight level 180 is shown. Then, the pilot may push the rotary knob to enter the flight level in the level field as shown in FIG. 5H. The disappearance of the rectangle indicates the entry of the level into the field. Because there are no more variable fields, the clearance has been entered.

Upon being entered, the clearance could be presented to the flight crew on the HSD as a modification to the existing flight plan. Similar to FIG. 4A and as shown in FIG. 5I, the clearance is shown as the text message "Entry: At WP02 CLIMB TO AND MAINTAIN FL180" in the HSD. As indicated in both the HSD and the VSD by the addition of a square to the flight plan and the text "<<FL 180>>" adjacent to the square, the FMS 120 has calculated and created a waypoint along the flight plan at the point in which the aircraft will reach FL 180 after beginning its climb at WP02. The dashed line added in the VSD indicates the change to the vertical flight path resulting from the entered clearance.

Figure 5J:
FIG. 5J provides a pilot's action of accepting the flight plan modification using a control panel.

If the clearance has been entered correctly, the crew may push the button to accept the clearance as shown in FIG. 5J, at which time the FMS activates the amended flight plan indicative of the changes made in the clearance. The modified flight plan is presented to the flight crew in both the HSD and the VSD as shown in FIG. 5K. As shown in the VSD, the visual appearance of the vertical profile has changed; the solid line corresponds to the flight plan now stored in the FMS 120, and the dashed line indicates the vertical profile of the former flight plan. As embodied herein, the RMG 130 may be configured to retain former flight plan(s) and have them displayed along with the current flight plan that has been modified. Once the modified flight plan has been accepted, the autopilot may initiate the climb to flight level 180 upon reaching waypoint WP02 if, for example, it is operating in a "VNAV" mode.

In addition to the HMI device 110 of FIGS. 5A through 5K comprised of a display window, a standard push button, and a combination rotary knob/push button, the same procedures may be performed when the HMI device 110 comprised of the display window has been configured with a touchscreen display, and the variable fields are configured as GUIs; instead of making selections with a standard push button(s) and a combination rotary knob/push button, he or she may accomplish the making of the same selections via the GUIs by clicking a CCD and/or tapping on the screen following the same procedures.

Figure 6A:
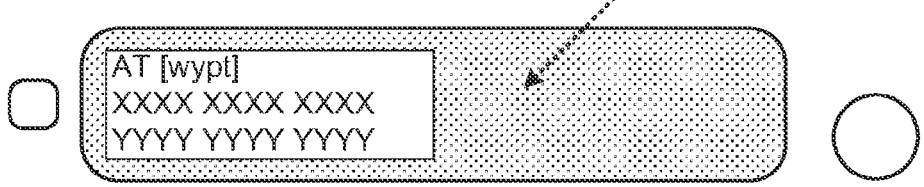
FIGS. 6A through 6H provide a sequence of pilot actions for recording a command not stated in the existing route plan using graphical user interface pop-up menus displayed on a display unit.
Figure 6B:
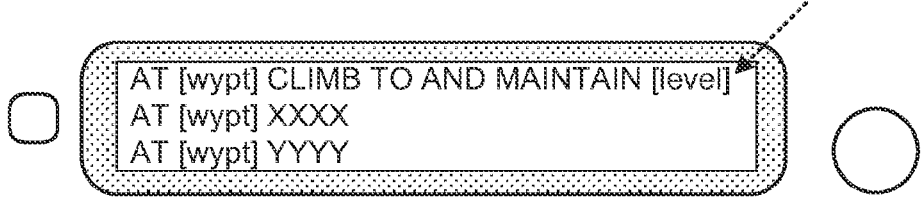
Figure 6C:

As shown in FIG. 6A, the pilot may tap on the screen to bring up a pop-up menu of the pre-formatted messages for all clearances. Then, the pilot scrolls through a list of all clearances that begin with "AT [waypoint]" to get to the "AT [waypoint] CLIMB TO AND MAINTAIN [level]" pre-formatted message. Once the correct message has been indicated on the screen, he or she may tap on the screen to select the message as shown in FIG. 6B. Upon the selection of the correct message, the RMG 130 could be programmed to automatically activate the first variable field, which is indicated in FIG. 6C with the appearance of the pop-up menu; moreover, because the first variable field is a way-point field, the RMG 130 could be programmed to automatically populated the variable field with the next waypoint(s) (i.e., WP01, WP02, WP03) of the flight plan.

Figure 6D:
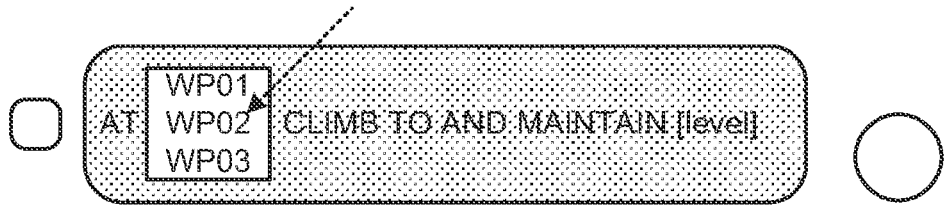
Figure 6E:
Figure 6F:
Figure 6G:
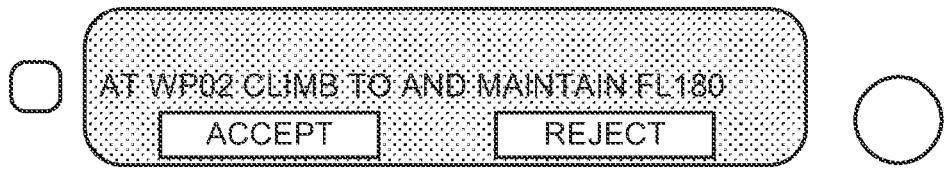

Then, the pilot may tap on the screen to select "WP02" as shown in FIG. 6D to enter the waypoint in the field. Once the waypoint field has been entered, the next variable field is highlighted by presenting a pop-up menu corresponding to the "level" variable field as shown in FIG. 6E. Then, the pilot may tap on the screen to select "FL180" as shown in FIG. 6F to enter the flight level in the level field as shown in FIG. 6G. Because there are no more variable fields, the clearance has been entered.

Upon being entered, the clearance could be presented to the flight crew on the HSD. Following the previous discussion, the clearance is shown as the text message "Entry: At WP02 CLIMB TO AND MAINTAIN FL180" in the HSD. As indicated in both the HSD and the VSD by the addition of a square to the flight plan and the text "<<FL 180>>" adjacent to the square, the FMS 120 has calculated and created a waypoint along the flight plan at the point in which the aircraft will reach FL 180 after beginning its climb at WP02. The dashed line added in the VSD indicates the change to the vertical flight path resulting from the entered clearance.

Figure 6H:
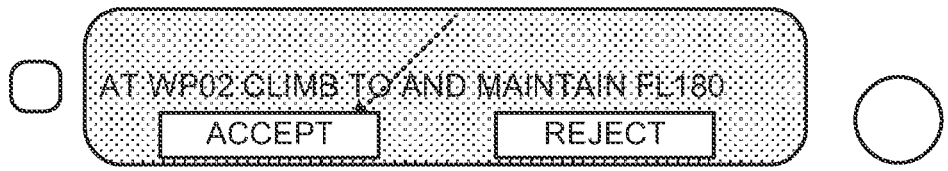

If the clearance has been entered correctly, the crew may tap the "ACCEPT" GUI as shown in FIG. 6H, at which time the FMS activates the amended flight plan indicative of the changes made in the clearance. The modified flight plan is presented to the flight crew in both the HSD and the VSD as shown in FIG. 5K.

Although the preceding discussion was drawn towards a touchscreen integrated into a control panel, the embodiments herein may be applied to the PED which has established wireless communication with the FMS 120 through, for example, a Wi-Fi network to which the PED and the FMS 120 are electronically connected. Once a user has launched an application installed in the PED and configured with the methods disclosed herein, a retrieval of the flight plan from the FMS 120 and a sending of an accepted, modified flight plan to the FMS 120 may be performed by the PED via the Wi-Fi network.

Figure 7A:
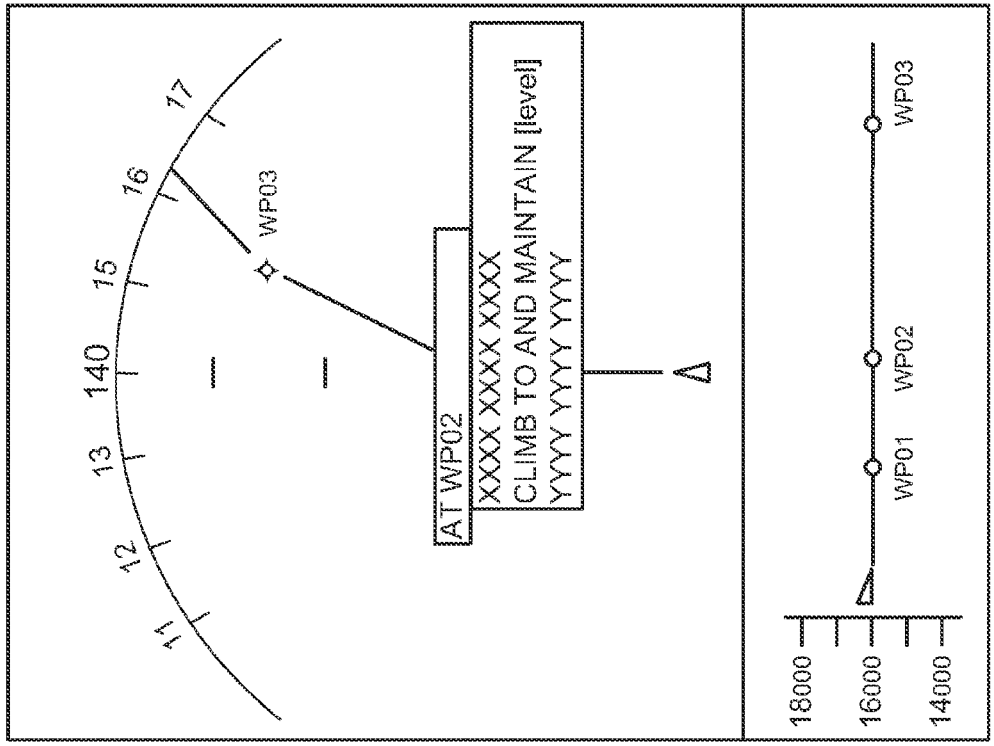
FIGS. 7A through 7D provide a second sequence of pilot actions for recording a command not stated in the existing route plan using graphical user interface pop-up menus displayed on a display unit.
Figure 7B:
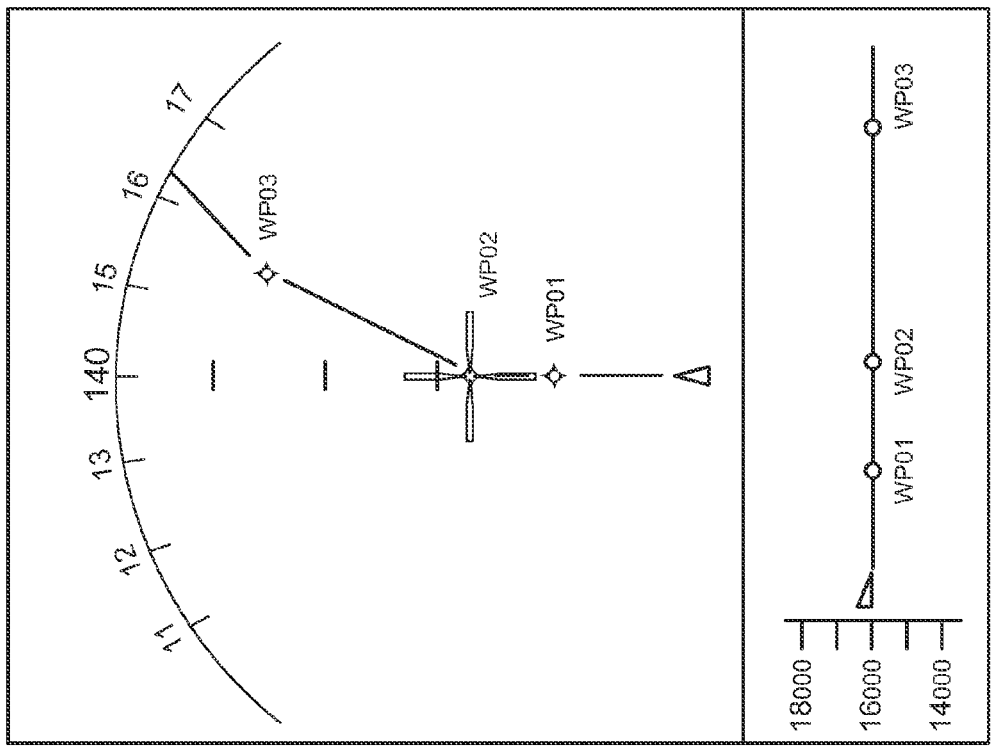

In addition to the HMI devices 110 of FIGS. 5A-5H, 5J, and 6A-6H, the HMI device 110 could be a CCD used in conjunction with a display unit configured to present GUIs; the employment of the CCD in conjunction with GUIs is known to those skilled in the art. Referring to FIG. 7A, the HSD and the VSD of FIG. 3 are presented along with a cursor that has been placed on top of the symbol of WP02 which, for the purpose of illustration and not of limitation, is comprised of a GUI. After the pilot has selected the waypoint, a pop-up menu comprised of one or more of the pre-formatted messages may be presented as shown in FIG. 7B. Moreover, the menu could be limited to those pre-formatted messages applicable to waypoints. As observed, the desired "AT WP02 CLIMB TO AND MAINTAIN [flight level]" pre-formatted message is initially in view; if another pre-formatted message is desired and not in view, then the pilot may drill through and/or scroll down until the desired pre-formatted message is in view and selectable. Because the desired pre-formatted message is in view, the pilot may select it.

Figure 7D:
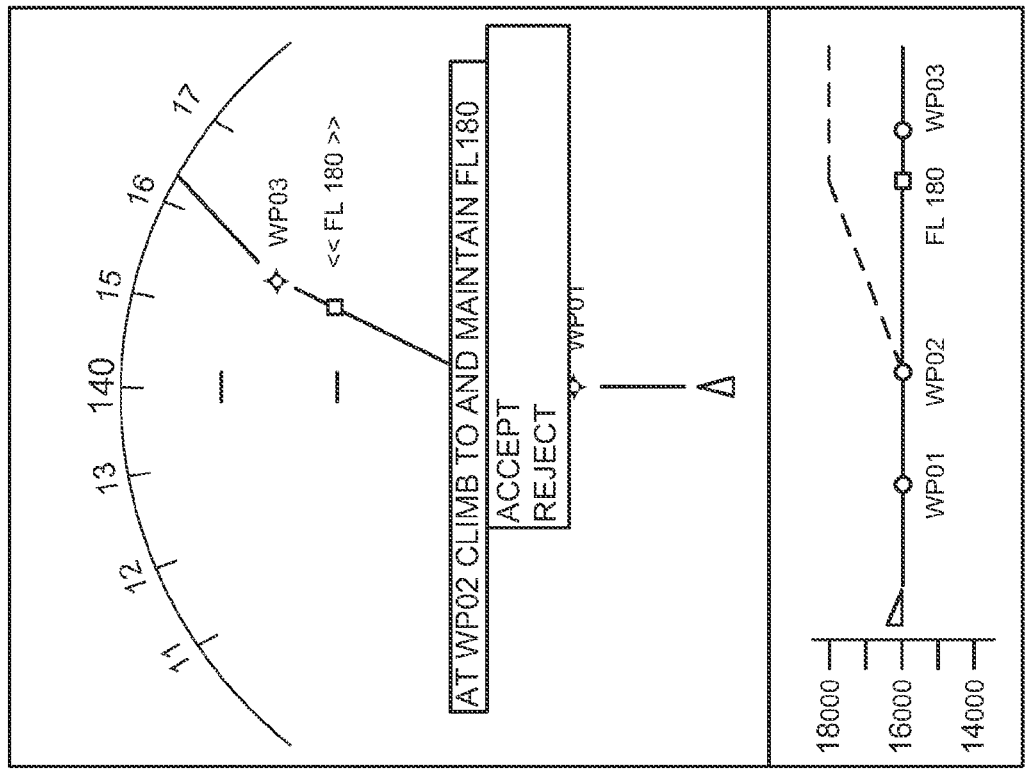
Figure 7C:
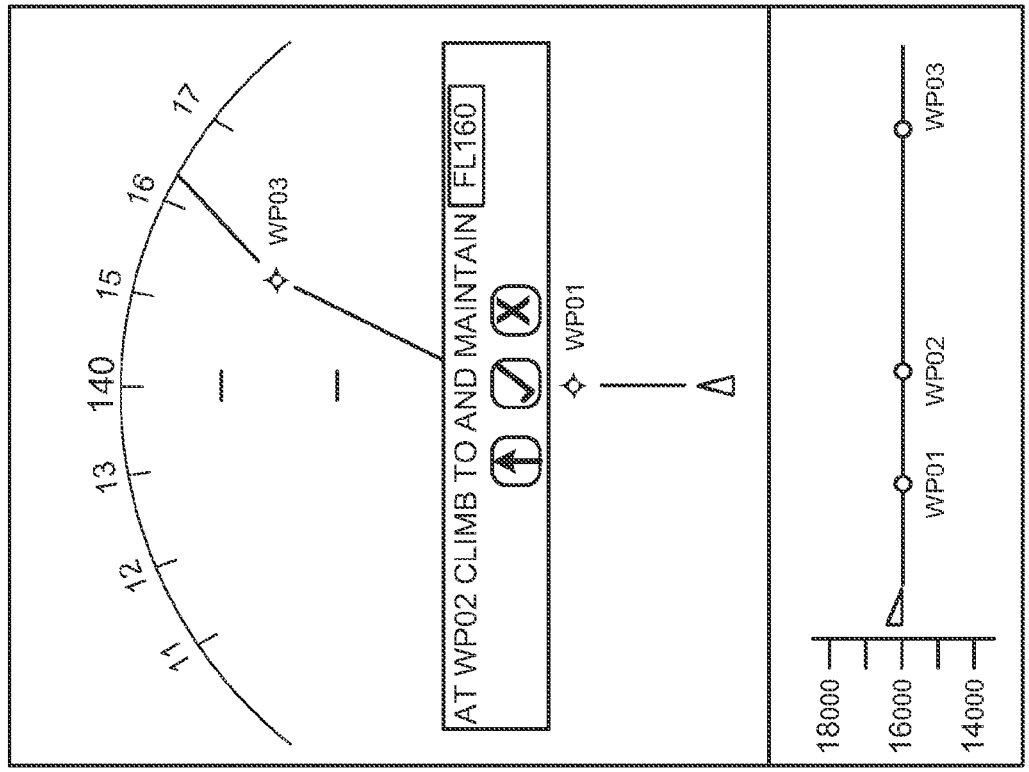

Referring to FIG. 7C, the desired pre-formatted message selected by the pilot is shown. Unlike the pre-formatted message shown in FIG. 5B through 5E, a waypoint variable field is not needed as the waypoint has been defined by the selection of the GUI. Instead, the pre-formatted message corresponding to the pre-formatted message of FIG. 5F is presented in FIG. 7C, where the "level" variable field is highlighted and populated with the current flight level of ownship corresponding to the altitude of 16,000 feet MSL. In addition, three more GUIs are presented: one GUI is comprised of an "up" arrow, another is comprised of a checkmark, and the other is comprised of an "X." Because flight level 180 is desired, the pilot may select the "up" arrow GUI twice (assuming 1,000 feet intervals). After the variable 180 is shown in the "level" field, the pilot may select the checkmark GUI, indicative of his or her acceptance of the clearance. The pilot may select the "X" to abort the current selection(s). Because there are no more variable fields, the clearance has been entered upon the selection of the checkmark.

Upon being entered, the proposed modification could be presented to the flight crew on the HSD as shown in FIG. 7D, where the pilot is then presented with a pop-up menu comprised of either an "ACCEPT" GUI or "REJECT" GUI. As indicated in both the HSD and the VSD by the addition of a square to the flight plan and the text "<<FL 180>>" adjacent to the square, the FMS has calculated and created a waypoint along the flight plan at the point at which the aircraft will reach FL 180 after beginning its climb at WP02. The dashed line added in the VSD indicates the change to the vertical flight path resulting from the entered clearance. If the proposal has been entered correctly, the pilot may select the "ACCEPT" GUI, at which time the FMS will activate the modified flight plan; if the pilot is unable to comply with the proposal, he or she may select the "REJECT" GUI. Upon the acceptance of the proposal, the now-modified flight plan is presented to the flight crew in both the HSD and the VSD as previously shown in FIG. 5K. Moreover, once the clearance has been accepted, the autopilot may initiate the climb to flight level 180 upon reaching waypoint WP02 if, for example, it is operating in a "VNAV" mode.

Although the preceding discussion of FIGS. 7A-7D was drawn towards a CCD used in conjunction with a display unit configured to present GUIs, the same procedures may be performed when the HMI device 110 is comprised of a touchscreen display; instead of making selections with a CCD, the pilot may make the same selections from the GUIs by tapping on the screen instead of clicking the CCD. In addition, the method of the previous discussion may be applied to the PED which has established a wireless communication with the FMS 120. Once a user has launched an application to modify the flight plan, data representative of the VSD and/or the HSD may be sent to the PED via the Wi-Fi network. If the application has not been configured with the pre-formatted messages for all clearances, the FMS 120 configured with these may send them to the PED.

Figure 8A:
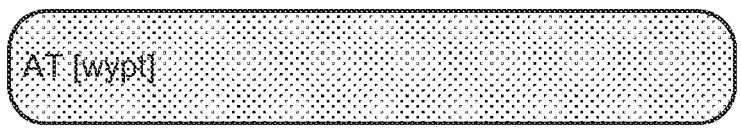
FIGS. 8A through 8F provide a sequence of pilot vocal commands for recording a command not stated in the existing route plan using graphical user interface pop-up menus displayed on a display unit voice input device.
Figure 8B:
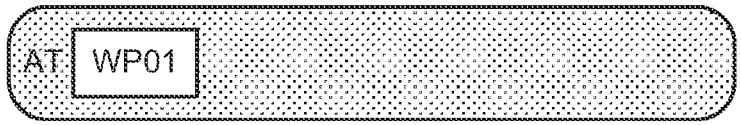
Figure 8C:
Figure 8D:
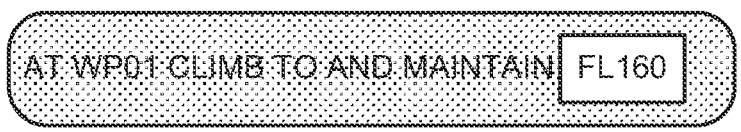
Figure 8E:
Figure 8F:

In addition to the HMI devices 110 comprised of the tactile input devices, the HMI devices 110 may also be comprised of voice input device that may be used separately or in conjunction with one or more tactile input devices. For instance, after enabling the HMI device 110 for receiving voice input, the pilot speaks the entire clearance, during which the display may adapt the message in response to the pilot's spoken words. The pilot may begin speaking the modification by saying "at waypoint." In response, the display may present the message shown in FIG. 8A. As the pilot continues by saying the word "one", the display may respond by presenting the message shown in FIG. 8B. Then, as the pilot continues by saying the words "climb to and maintain", the display may respond by presenting the message shown in FIG. 8C. Then, as the pilot continues by saying the words "flight level", the display may respond by presenting the message shown in FIG. 8D. Then, as the pilot concludes by saying "one eight zero", the display may respond by presenting the message shown in FIG. 8E. Upon his or her command to enter the message, the display may respond by presenting the message shown in FIG. 8F. Moreover, this method of vocally entering the modification—and the displayed responses—may be employed in a similar fashion to the HSD and VSD shown in FIGS. 7A through 7D.

It should be noted that the methods described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limited to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for recording at least one command not stated in an approved flight plan, comprising:
a route management system;
at least one display unit configured to display an image divided into a plurality of visible windows and within which at least one of a horizontal situation display ("HSD") image and a vertical situation display ("VSD") image, where
  the HSD image of a first lateral profile of ownship and an approved flight plan stating at least a waypoint, command, and altitude is presented within a first window, and
  the VSD image of a first vertical profile of ownship, an altitude scale, and the approved flight plan is presented within a second window different from the first window, where
    the HSD image of the first lateral profile and the VSD image of the first vertical profile include at least one graphical user interface ("GUI") representing at least one waypoint;
at least one human-machine interface ("HMI") device configured to:
  receive input data representative of a user's request to modify the approved flight plan by a user selecting one GUI representing at least one waypoint of the HSD image of the first lateral profile and the VSD image of the first vertical profile, and
  provide the input data to an avionics route modification device; and
the avionics route modification device configured to:
  receive the input data;
  retrieve flight management data representative of the approved flight plan;
  generate a message data set representative of at least one pre-formatted message overlying the at least one of the first lateral profile and the first vertical profile in response to the receiving the input data, where
    the at least one pre-formatted message includes within the message at least one visually-conspicuous, user-interactive variable field within which at least one command not stated in the approved flight plan is visible to the user;
  receive command data representative of at least one command not stated in the approved flight plan from a user's interaction with at least one visually-conspicuous, user-interactive variable field;
  send the command data to the route management system, such that
    the presentation of the at least one of the HSD image and the VSD image includes
      a second lateral profile and a second vertical profile, respectively, incorporating the at least one command represented in the command data, where
        the at least one of the second lateral profile and the second vertical profile is presented simultaneously with the first lateral profile and the first vertical profile, respectively, and
      a message incorporating the at least one command represented in the command data and at least one user-interactive field through which a user's acceptance of a modification to the approved flight plan is made;
  receive acceptance data representative of the user's acceptance; and
  send the acceptance data to the route management system, whereby
    the approved flight plan is modified, and
    at least one of the second lateral profile and the second vertical profile is presented in the HSD image and the VSD image, respectively.

2. The system of claim 1, wherein the at least one HMI device is comprised of a tactile input device.

3. The system of claim 1, wherein the at least one HMI device is comprised of a voice input device.

4. The system of claim 1, wherein
the route management system is comprised of a flight management system, and
the avionics route modification device is a component of the flight management system.

5. The system of claim 1, wherein the avionics route modification device is a component of a portable electronic device.

6. The system of claim 5, wherein the retrieval of the flight management data and the sending of the data representative of the accepted, modified route plan is performed via a Wi-Fi network.

7. The system of claim 1, wherein the user's request to modify the approved flight plan is made in response to a request to modify the approved flight plan is received from air traffic control.

8. The system of claim 1, wherein the at least one visually-conspicuous, user-interactive variable field is comprised of a GUI.

9. The system of claim 1, wherein the content of the at least one visually-conspicuous, user-interactive variable field is based upon at least one waypoint of the approved flight plan.

10. The system of claim 1, wherein the content of the at least one visually-conspicuous, user-interactive variable field is based upon a proximity to at least one waypoint of the approved flight plan.

11. A device for recording at least one command not stated in an approved flight plan, comprising:
an avionics route modification device configured to:

receive input data, where
  an image displayable on at least one display unit is divided into a plurality of visible windows and within which at least one of a horizontal situation display ("HSD") image and a vertical situation display ("VSD") image, where
    the HSD image of a first lateral profile of ownship and an approved flight plan stating at least a waypoint, command, and altitude is presented within a first window, and
    the VSD image of a first vertical profile of ownship, an altitude scale, and the approved flight plan is presented within a second window different from the first window, where
      the HSD image of the first lateral profile and the VSD image of the first vertical profile include at least one graphical user interface ("GUI") representing at least one waypoint, and
    the input data is representative of a user's request to modify the approved flight plan by a user selecting one GUI representing at least one waypoint of the HSD image of the first lateral profile and the VSD image of the first vertical profile;
retrieve flight management data representative of the approved flight plan;
generate a message data set representative of at least one pre-formatted message overlying the at least one of the first lateral profile and the first vertical profile in response to the receiving the input data, where
  the at least one pre-formatted message includes within the message at least one visually-conspicuous, user-interactive variable field within which at least one command not stated in the approved flight plan is visible to the user;
receive command data representative of at least one command not stated in the approved flight plan from a user's interaction with at least one visually-conspicuous, user-interactive variable field;
send the command data to the route management system, such that
  the presentation of the at least one of the HSD image and the VSD image includes
    a second lateral profile and a second vertical profile, respectively, incorporating the at least one command represented in the command data, where
      the at least one of the second lateral profile and the second vertical profile is presented simultaneously with the first lateral profile and the first vertical profile, respectively, and
    a message incorporating the at least one command represented in the command data and at least one user-interactive field through which a user's acceptance of a modification to the approved flight plan is made;
receive acceptance data representative of the user's acceptance; and
send the acceptance data to the route management system, whereby
  the approved flight plan is modified, and
  at least one of the second lateral profile and the second vertical profile is presented in the HSD image and the VSD image, respectively.

12. The device of claim 11, wherein the user's request to modify the approved flight plan is made in response to a request to modify the approved flight plan is received from air traffic control.

13. The device of claim 11, wherein the at least one visually-conspicuous, user-interactive variable field is comprised of a GUI.

14. The device of claim 11, wherein the content of the at least one visually-conspicuous, user-interactive variable field is based upon at least one waypoint of the approved flight plan.

15. The device of claim 11, wherein the content of the at least one visually-conspicuous, user-interactive variable field is based upon a proximity to at least one waypoint of the approved flight plan.

16. A method for recording at least one command not stated in an approved flight plan, comprising:
performing the following elements, where such elements are performed by an avionics route modification device:
  receiving input data, where
    an image displayable on at least one display unit is divided into a plurality of visible windows and within which at least one of a horizontal situation display ("HSD") image and a vertical situation display ("VSD") image, where
      the HSD image of a first lateral profile of ownship and an approved flight plan stating at least a waypoint, command, and altitude is presented within a first window, and
      the VSD image of a first vertical profile of ownship, an altitude scale, and the approved flight plan is presented within a second window different from the first window, where
        the HSD image of the first lateral profile and the VSD image of the first vertical profile include at least one graphical user interface ("GUI") representing at least one waypoint, and
      the input data is representative of a user's request to modify the approved flight plan by a user selecting one GUI representing at least one waypoint of the HSD image of the first lateral profile and the VSD image of the first vertical profile;
  retrieving flight management data representative of the approved flight plan;
  generating a message data set representative of at least one pre-formatted message overlying the at least one of the first lateral profile and the first vertical profile in response to the receiving the input data, where
    the at least one pre-formatted message includes within the message at least one visually-conspicuous, user-interactive variable field within which at least one command not stated in the approved flight plan is visible to the user;
  receiving command data representative of at least one command not stated in the approved flight plan from a user's interaction with at least one visually-conspicuous, user-interactive variable field;
  sending the command data to a route management system, such that
    the presentation of the at least one of the HSD image and the VSD image includes
      a second lateral profile and a second vertical profile, respectively, incorporating the at least one command represented in the command data, where
        the at least one of the second lateral profile and the second vertical profile is presented simultaneously with the first lateral profile and the first vertical profile, respectively, and
      a message incorporating the at least one command represented in the command data and at least one user-interactive field through which a user's acceptance of a modification to the approved flight plan is made;

receiving acceptance data representative of the user's acceptance; and sending the acceptance data to the route management system, whereby the approved flight plan is modified, and at least one of the second lateral profile and the second vertical profile is presented in the HSD image and the VSD image, respectively.

17. The method of claim 16, wherein the user's request to modify the approved flight plan is made in response to a request to modify the approved flight plan is received from air traffic control.

18. The method of claim 16, wherein the at least one visually-conspicuous, user-interactive variable field is comprised of a GUI.

19. The method of claim 16, wherein the content of the at least one visually-conspicuous, user-interactive variable field is based upon at least one waypoint of the approved flight plan.

20. The method of claim 16, wherein the content of the at least one visually-conspicuous, user-interactive variable field is based upon a proximity to at least one waypoint of the approved flight plan.

* * * * *